United States Patent [19]

Platel et al.

[11] Patent Number: 4,607,363

[45] Date of Patent: Aug. 19, 1986

[54] BUFFER DEVICE FOR A VOICE TRANSMISSION NETWORK

[75] Inventors: Guy Platel, Villeneuve Loubet; Pierre Secondo, Saint Jeannet; Sylvain Wiest, Villeneuve Loubet, all of France

[73] Assignee: International Business Machines Corp., Armonk, N.Y.

[21] Appl. No.: 735,512

[22] Filed: May 20, 1985

[30] Foreign Application Priority Data

May 23, 1984 [EP] European Pat. Off. ........ 84430016.0

[51] Int. Cl.$^4$ .......................... H04J 3/24; H04Q 11/04
[52] U.S. Cl. .......................................... 370/94; 370/61
[58] Field of Search ....................... 370/94, 60, 56, 61, 370/91

[56] References Cited

U.S. PATENT DOCUMENTS 4,500,990  2/1985  Akashi ................................. 370/94
4,538,259  8/1985  Moore .................................. 370/94

FOREIGN PATENT DOCUMENTS 0013049  1/1983  Japan ................................... 370/94
0077351  5/1983  Japan ................................... 370/94

*Primary Examiner*—Douglas W. Olms
*Assistant Examiner*—Curtis Kuntz
*Attorney, Agent, or Firm*—John B. Frisone

[57] ABSTRACT

A buffer device for a digital transmission network transmitting voice signals, by packets, including so-called purging means for eliminating a number $x_{(t)}$ of the oldest packets stored in the buffer to prevent saturation thereof. The number of packets received at the input of the buffer within a given time interval is used to address a storage that supplies two pre-stored digital values, namely, $x_{(t)}$ and $L_{(t)}$. When the contents of the buffer are equal to $L_{(t)}$, a number $x_{(t)}$ of the oldest packets contained in the buffer are dropped.

11 Claims, 5 Drawing Figures

BUFFER DEVICE FOR A VOICE TRANSMISSION NETWORK

DESCRIPTION

1. Technical Field

This invention relates to the transmission of digital data derived from voice signals, and, more particularly, to the transmission of voice signals as packets of bits in a system that includes a buffer device.

2. Background Art

Existing multiplexing techniques allow data from several sources to be concentrated on the same transmission line. Where the sources operate in an intermittent and random manner, the number of sources connected to the transmission line through a network can exceed the number theoretically allowed by the instantaneous capacity of the line. In the instance of sources that generate voice signals, techniques called TASI (Time Assignment Speech Interpolation) or DSI (Digital Speech Interpolation) are used.

In DSI-type systems, bits or packets of bits from sources that are active at a given instant are serialized prior to being transmitted over the line. Transmission over the line is performed synchronously (particularly through a digital modulator/demodulator or modem), whereas bits are generated by the sources in an asynchronous manner. A buffer device is therefore necessary between the sources and the transmission line. However, the buffer introduces an additional delay in transmission between a source and the person for whom the voice signals from that source are destined. In a realtime conversation, it will be appreciated that if this delay exceeds a given value, the message will become unintelligible or difficult to understand. In such situations, it is considered preferable not to transmit message portions that remained too long in the buffer device. To this end, it is necessary to "purge" the buffer device by eliminating data that remained too long therein.

If the purging operation is performed systematically, a limit "L" to the capacity of the buffer is set and the buffer is purged of a predetermined, fixed quantity "x" when the threshold L is reached. This method may perturb the traffic by rendering unintelligible the message transmitted to certain called parties if purging operations have been performed repeatedly without taking special precautions.

OBJECT OF THE INVENTION

It is the object of this invention to provide a buffer device associated with a purging system designed to minimize the risk of perturbing the traffic.

Also, certain methods exist which make it possible to compensate, at the receiving end, for portions of voice messages which were not received because they were subjected, in particular, to a purging operation at the transmitting end, by taking into consideration the specific properties of voice signals.

This invention relates more particularly to means for purging the buffer device that permit minimizing the risk of voice messages being deteriorated when transmitted in a system provided with means for reconstituting portions of messages that were lost, or received in an erroneous manner. The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
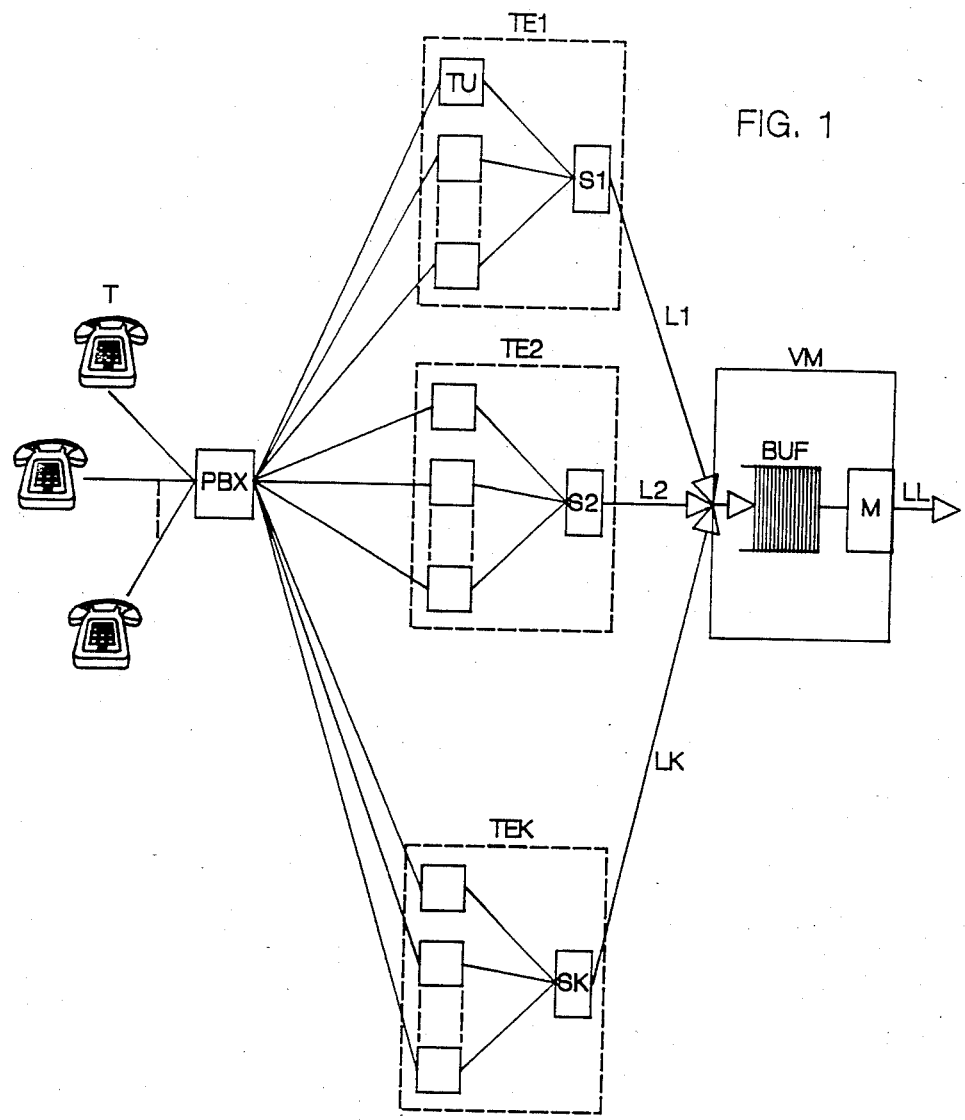
FIG. 1 is a schematic diagram of a portion of a type of transmission network in which the invention finds application.

FIG. 1 is a schematic diagram of the transmitting end of a type of voice transmission network in which the invention finds application. The telephone sets (T) of a large number of users are connected to the transmission network through a switching unit or telephone exchange (PBX or CX). In operation, a switching unit output line connected to a voice signal coding terminal unit (TU) is assigned to every user who seeks access to another telephone user. The purpose of unit TU is to perform a digital coding of the voice signal. In this example, the digital coding is performed through the use of the so-called BCPCM (Block Companded PCM) techniques as described, in particular, in U.S. Pat. No. 4,216,354. In other words, the voice signal from a given speaker is processed in the form of successive segments of predetermined duration (20 ms, for example). Thus, each segment provides a block of bits representing a signal duration of 20 ms.

Terminal units TU are grouped within terminal equipments (TE), there being eight TUs, for example, in the same TE. Each terminal equipment is provided with scanning means (S1, S2, ..., SK) that sequentially scan the TUs attached thereto in order to collect the blocks of data to be transmitted. Each scanning means S1-SK is controlled by a local clock (not shown) to collect every 5 ms two blocks of bits representing a voice signal duration of 40 ms. These two blocks of bits form a packet of bits that is sent to a concentrator or voice multiplexer VM over a line L1, L2 or LK. The packets of bits from the TUs connected to the same terminal equipment TE are sequentially transmitted over a corresponding line L1-LK at a rate determined by the corresponding scanning means S1-SK. If it is assumed that the clocks associated with terminal equipments TE1-TEK are mutually independent, then the packets of bits will be transmitted to concentrator VM in an asynchronous manner.

Also, conversations between speakers using a telephone set T include periods of silence and periods of actual activity. A period of actual activity is defined as a period during which a talkspurt is generated by the source of voice signals connected to a terminal unit TU. These periods of actual activity are detected by an activity detector (VAD) not shown. A type of activity detector that can be used in this invention is described in a copending U.S. patent application Ser. No. 616,021 to the same assignee.

Concentrator VM uses a programmed processor to which an interrupt request is submitted whenever a packet of bits is received, such that a so-called input/output (I/O) operation may be executed. Since the clocks of the various terminal equipments TE1-TEK are mutually independent, said I/O operations are requested in an asynchronous manner. In other words, the packets of bits reach concentrator VM in an asynchronous manner. However, all bits collected by the concentrator are serialized in a synchronous manner on line LL (transmission channel), this being done, if necessary, through a modulator/demodulator or modem M. The modem may use, for example, the so-called double sideband-quadrature carrier (DSB-QC) techniques of the type employed in IBM 3865 Modems. It is therefore necessary to regulate the flow of bits between the input and the output of the concentrator, or more exactly between the input of the concentrator and that of the modem. This result is achieved through the use of a buffer storage (BUF) schematically shown in FIG. 1.

For obvious economic and technical reasons, the length L of the buffer storage (BUF) must be limited. Length L usually is defined on the basis of statistical considerations.

Let N be the number of telephone conversations taking place at one instant, and C the capacity of line LL in equivalent channels. This means that, given a 144 Kbps channel LL used to carry voice signals coded at 9 Kbps, the term C=144/9=16. The use of interpolation techniques such as DSI allows the transmission network to operate in such a way that N can be higher than C, taking into account the fact that, as mentioned above, during any conversation the voice channel associated with a given speaker is only used intermittently.

Reasonable limits to the capacity of buffer storage BUF can be determined statistically. But, in view of the random character of the ratio N/C, buffer storage BUF may be saturated at one given instant. Hence a risk of data representing coded voice signals being lost exists.

Also, the introduction of data in the buffer storage further delays the transmission of voice signals. In spite of the special means provided for in a conventional DSI system, a significant delay in transmission may render the conversation unintelligible or at any rate difficult. In practice, assuming a realtime conversation, a transmission delay not exceeding 300 ms between the user of a telephone set and the called party is generally considered acceptable. Accordingly, rather than losing the more recent packets of data because of saturation of the buffer storage, it is preferable to "purge" the buffer by eliminating consecutive packets among the oldest ones. In this example, the number x of packets to be eliminated will be selected from the oldest ones. The packets of data thus eliminated, and consequently not transmitted, will naturally be lost to the called party. However, there exist some methods enabling the receiver used by that party to compensate for such losses of data derived from voice signals. One of these methods is described in European patent application No. 83430035.2 filed by the present applicant Oct. 28, 1983. Such methods themselves have limitations. In particular, repeated losses of packets of bits intended for the same party can render said compensation ineffective. This means that the size (x) of the purge relative to the length L of the buffer storage must be carefully defined in order to avoid this type of situation. This can be done on the basis of statistical considerations resulting from studies of voice transmission networks that make it possible a priori to assign predetermined, fixed values to x and L. However, if at one given instant in actual operation, the value of x is found to be too low, the buffer storage will saturate and recent packets may be lost; on the other hand, if x is too high, the transmission system will be needlessly penalized through losses of packets that could have been avoided.

The system of the present invention overcomes these difficulties through a dynamic determination of the characteristics of the buffer storage and the "purging" device associated therewith.

It should first be noted that the queue of packets of data derived from the voice signals to be transmitted and stored in the buffer BUF varies whenever a packet is received or transmitted. During those periods when the instantaneous incoming traffic is less than the outgoing traffic (on line LL), the buffer storage empties. Such periods will be termed "underload periods" hereafter.

Conversely, during those periods when the instantaneous incoming traffic exceeds the outgoing traffic on the output line, the buffer fills up. Such periods will be called "overload periods" hereafter.

Under normal traffic conditions, overload periods alternate with underload periods. In order for the purge to be adaptive, the system must be able to detect the overload periods.

The method of the invention makes it possible to determine in realtime (t) the optimum values $x_{(t)}$ and $L_{(t)}$ to be assigned to x and L as a function of the instantaneous value of the overload, so as to carry the highest traffic volume possible while reducing to a minimum the time interval necessary for transmission of the packets.

If we designate, as above, the number of conversations taking place as N and the equivalent capacity of the transmission channel as C, then, as is known, the advantage of DSI is defined by the ratio $N/C > 1$.

Among the N conversations taking place within a time interval corresponding to that during which the concentrator inputs are scanned (e.g. 40 ms), only $n_{(t)}$ sources of packets of data will actually be active, that is, provide the coder in terminal unit TU with packets of bits corresponding to a talkspurt. If we determine this number $n_{(t)}$ every T=100 ms, for example, in a given transmission system, we find that it varies only slightly. Consequently, we may say that, during period T, the traffic received by multiplexer VM varies only slightly.

$$\text{Let } \rho_{(t)} = \frac{n_{(t)}}{C} \tag{1}$$

Since $n_{(t)}$ varies between zero and N, $\rho_{(t)}$ varies between zero and N/C. During the overload periods, $\rho_{(t)} > 1$.

According to the method of the invention, as soon as the queue within the buffer storage comprises more than L packets of bits, the storage is purged by eliminating x packets selected from the older ones ($x \leq L$). However, it will be recalled that the x packets to be eliminated need not necessarily be the older ones. More precisely, after dropping x packets, p packets are allowed to pass through the buffer to be applied to the output line until the capacity of the queue is again reached, at which time x waiting packets will again be dropped, then p packets will again be allowed to pass through the buffer, and so forth. Naturally, x and p vary as a function of time.

Accordingly, the operating cycle of the system of purges may be characterized as taking the following form:

eliminate $x_{(t)}$ packets,
allow $p_{(t+1)}$ packets to pass, eliminate $x_{(t+1)}$ packets,
allow $p_{(t+2)}$ packets to pass, etc . . .

In order for this purging method to be adaptive, the system must be provided with means for determining the optimum values of parameters such as x, p and L. That is, these means must be designed to avoid needless or excessive purges, taking into account not only the actual instantaneous traffic of the transmission system in which the invention finds application, but also the characteristics of said system.

It should first be noted that $x_{(t)}$ and $p_{(t)}$ are related by the following relations:

$$x_{(t)} = [p_{(t)} - 1] \cdot p_{(t)} \qquad (2)$$

or $$x_{(t)} = ((n_{(t)}/C) - 1) \cdot p_{(t)} \qquad (3)$$

The object here is to carry the highest possible volume of traffic by minimizing the time interval required for transmitting the packets. Also, since it is intended to use the invention in a system which, at its receiving end, will reconstitute the lost packets, the characterstics of the device used for reconstructing the packets must be taken into consideration here. Such a device is described in European patent application No. 83430035.2 filed Oct. 28, 1983; the operation of this device is optimal when the loss of consecutive packets from the same speaker is prevented. Consequently, a constraint will be imposed here to try to prevent the elimination, through a purge, of two consecutive packets from the same voice unit TU. Hence the constraints:

$$x_{(t)} \geq 1 \qquad (4)$$

$$x_{(t)} \leq n_{(t)} \qquad (5)$$

so that:

$$x_{(t)} \leq p_{(t)} \cdot C \qquad (6)$$

In addition, $p_{(t)}$ packets are allowed to pass through, but it is desired that each active speaker, that is to say, each speaker generating a talkspurt, should be allowed to generate at least one packet before being submitted to a purge, hence the additional constraint:

$$p_{(t)} \geq n_{(t)} \qquad (7)$$

$$x_{(t)} \geq p_{(t)} \cdot C[p_{(t)} - 1] \qquad (8)$$

The above constraints minimize the impact of the elimination of packets on the quality of voice in the context considered. They can be satisfied simultaneously, only if $p_{(t)} \leq 2$, which is realistic (since the advantage of TASI or DSI is, in general, about 1.5).

Accordingly, the chosen value of $x_{(t)}$ will be the integer immediately higher than $p_{(t)} \cdot C(p_{(t)} - 1)$.

Obviously, it is not possible to eliminate more packets than are included in the queue. Hence:

$$L_{(t)} \geq x_{(t)} \qquad (9)$$

Since it is desired that $L_{(t)}$ be minimal, it will be advantageous to choose:

$$L_{(t)} = x_{(t)} \qquad (10)$$

However, this is not essential to the operation of the system. Consequently, by measuring $n_{(t)}$ at sufficiently frequent intervals, optimum adjustment of the purge of the buffer can be achieved to attain the desired objectives.

Some additional precautions can be taken to prevent losses of data. A first precaution is derived from the fact that, although $n_{(t)}$ varies only slightly if the buffer is purged at frequent intervals (less than 100 ms, for example), it may be prudent, for certain values of $n_{(t)}$, to ensure that $p_{(t)} = n_{(t)} + \Delta n$ with $\Delta n = 2$ for example. In this case, the selected value of $x_{(t)}$ will be the integer immediately higher than:

$$(n_{(t)} + 2) \left( \frac{n_{(t)} + 2}{C} - 1 \right) \qquad (11)$$

A second precaution is derived from the fact that, because of the asynchronous character of the transmissions over lines L1 to LK, K packets could be simultaneously received at the input of the buffer storage. It is therefore prudent not to allow the value of $L_{(t)}$ to be less than K (or 10, for example).

Figure 2:
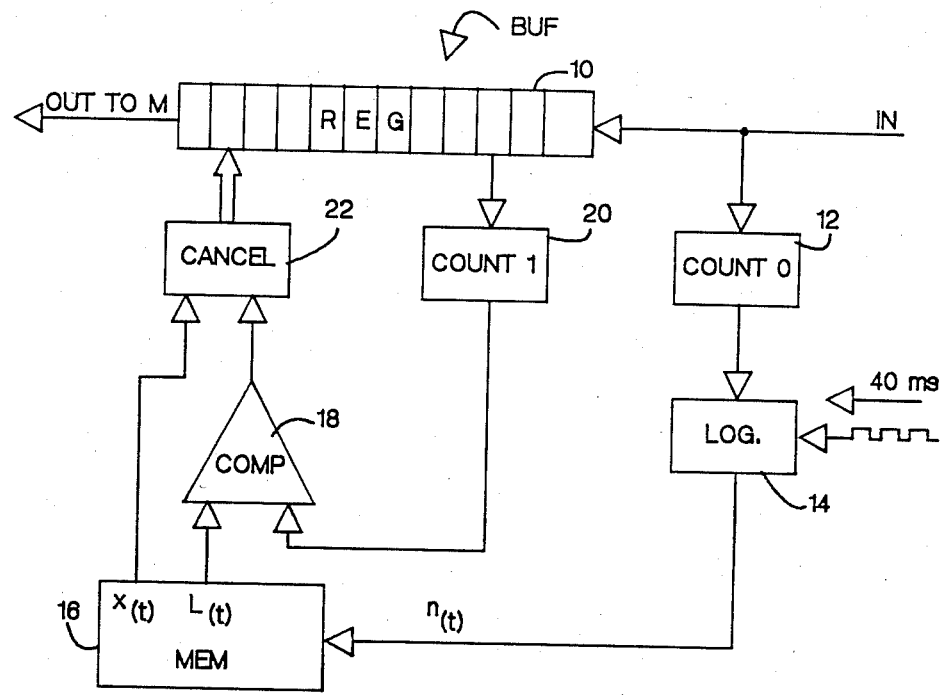
FIG. 2 is a schematic diagram of an embodiment of the invention.

In accordance with the above principles, the buffer device can be implemented as shown in FIG. 2. The input IN of a buffer register (REG) 10 is connected to lines L1 to LK, and to a packet counter (COUNT0) 12 whose output is connected to a logic circuit (LOG) 14. This logic circuit is also controlled by a clock (not shown) that supplies a realtime reference signal whose period is, in this example, set at 40 ms. The output from logic circuit 14 serves to address a memory (MEM) 16 whose output provides two values, namely, $x_{(t)}$ and $L_{(t)}$. Output $L_{(t)}$ is fed to a comparator (COMP) 18 whose second input is connected to a counter (COUNT1) 20. Counter 20 counts the packets contained in buffer register 10. The second output from memory 16, $x_{(t)}$, is fed to a purging device (CANCEL) 22, which is controlled by the output from comparator 18. Devices 16, 18 and 22 form the so-called purging means.

In operation, whenever a packet of bits is loaded into buffer register 10, the contents of counters 12 and 20 are increased by one unit. Every 40 ms, the clock (not shown) causes the count of counter 12 to be transferred to logic circuit 14 and counter 12 is reset to zero. The digital value loaded in logic circuit 14 represents $n_{(t)}$. This value is used to address memory 16, which supplies $x_{(t)}$ and $L_{(t)}$. When the contents of buffer register 10 as determined by counter 20 equal $L_{(t)}$, comparator 18 activates purging device 22. This device eliminates the older $x_{(t)}$ packets contained in buffer register 10 by shifting the contents of register 10 by $x_{(t)}$ packets, without allowing these packets to reach the input of modem M.

Table I below is based upon relations (1) to (11) given earlier. It has been assumed here that N=28, that C=16, and that $p_{(t)}$ varies from 0 to 1.75.

TABLE I

| $n_{(t)}$ | $p_{(t)}$ | $x_{(t)}$ | $L_{(t)}$ | $P_{(t)} = x_{(t)}/p_{(t)} - 1$ |
|---|---|---|---|---|
| 28 | 1.75 | 21 | 21 | 28 |
| 27 | 1.688 | 19 | 19 | 27.6 |
| 26 | 1.625 | 17 | 17 | 27.2 |
| 25 | 1.563 | 15 | 15 | 26.6 |
| 24 | 1.5 | 12 | 15 | 24 |
| 23 | 1.438 | 11 | 12 | 25.1 |
| 22 | 1.375 | 9 | 10 | 24 |
| 21 | 1.313 | 7 | 10 | 22.4 |
| 20 | 1.25 | 5 | 10 | 20 |

TABLE I-continued

| $n_{(t)}$ | $\rho_{(t)}$ | $x_{(t)}$ | $L_{(t)}$ | $p_{(t)} = x_{(t)}/\rho_{(t)} - 1$ |
|---|---|---|---|---|
| 19 | 1.188 | 4 | 10 | 21.3 |
| 18 | 1.125 | 3 | 10 | 24 |
| 17 | 1.063 | 2 | 10 | 31.7 |
| 16 | 1 | 1 | 10 | — |
| 15 | 0.938 | 1 | 10 | — |
| 14 | 0.875 | 1 | 10 | — |
| 13 | 0.813 | 1 | 10 | — |
| 12 | 0.75 | 1 | 10 | — |
| 11 | 0.688 | 1 | 10 | — |
| 10 | 0.625 | 1 | 10 | — |
| 9 | 0.563 | 1 | 10 | — |
| 8 | 0.5 | 1 | 10 | — |
| 7 | 0.438 | 1 | 10 | — |
| 6 | 0.375 | 1 | 10 | — |
| 5 | 0.313 | 1 | 10 | — |
| 4 | 0.25 | 1 | 10 | — |
| 3 | 0.188 | 1 | 10 | — |
| 2 | 0.125 | 1 | 10 | — |
| 1 | 0.063 | 1 | 10 | — |
| 0 | 0 | 1 | 10 | — |

It should be noted that, for the reasons previously given, a lower threshold of K=10 has been imposed for $L_{(t)}$.

Also, for obvious reasons, $x_{(t)}$ may not be less than unity.

Assuming that the constraint $p_{(t)}=n_{(t)}+2$ is imposed, and that, consequently, the value of $x_{(t)}$ is the integer immediately higher than $$(n_{(t)} + 2)\left(\frac{n_{(t)} + 2}{C} - 1\right),$$

Table I should be modified such that $p_{(t)}=n_{(t)}+2$, and, if the latter relation is not verified, then $x_{(t)}=n_{(t)}.(\rho_{(t)}-1)$ should be imposed. A table (not shown) slightly different from Table I would then be obtained.

The first, third and fourth columns of Table I, whether modified or not, are loaded into memory 16 of the device shown in FIG. 2. Every 40 ms, the value $n_{(t)}$ supplied by logic circuit 14 addresses a line in memory 16. Memory 16 then supplies a value for $x_{(t)}$ and a value for $L_{(t)}$.

The FIG. 2 device can of course include, in addition to the above, initialization means (not shown). Assuming an installation not customized initially, provision could be made for computation means capable of performing the operations corresponding to the mathematical expressions given above. In this case, after the communication network is installed, an operator would load the system with the values of the parameters, in particular those of N, C and, as necessary, the prescribed thresholds and correction factors. The computation means would then load memory 16 before starting to control communication service.

Figure 3:
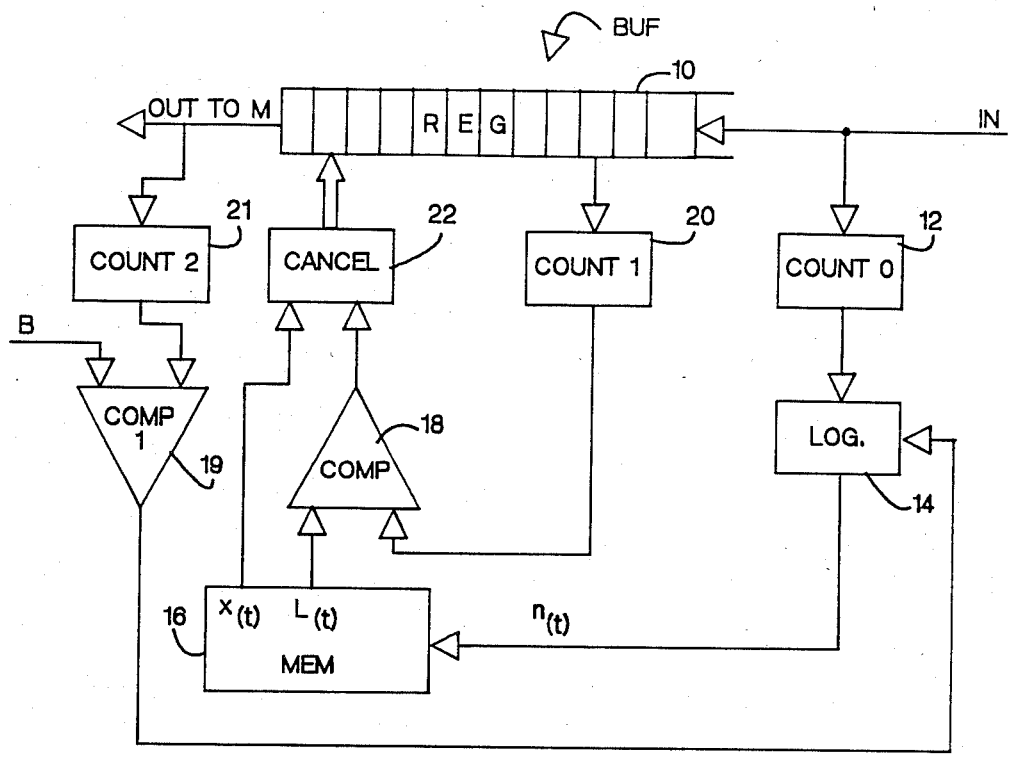
FIG. 3 illustrates an embodiment of the device of FIG. 2.

FIG. 3 illustrates a variant of the embodiment of the device of FIG. 2. The realtime clock (not shown) supplying the 40 ms time reference can be eliminated. Accordingly, a counter (COUTN2) 21 whose output is connected to a comparator (COMP1) 19 has its input connected to the output of shift register (REG) 10. The second input of comparator 19 receives a fixed value B. The contents of counter 21 increase by one whenever a packet is removed from buffer register 10 to be sent to modem M (not shown). When the contents of counter 21 reach value B, comparator 19 generates a logic signal that resets counter 21 to zero and activates logic circuit 14 as was done by the external clock signal. The logic signal from comparator 19 thus occurs at given time intervals which can be varied depending on the value of B. In principle, buffer register 10 supplies modem M with a packet of bits every Ts seconds (Ts=2.5 ms, for example). Thus, sixteen packets should leave buffer register 10 every 40 ms. If B=16, the time interval between two consecutive pulses from comparator 19 will be 40 ms. This corresponds to the clock signal mentioned in relation to FIG. 2.

It should however be noted that the buffer register may be empty during the underload periods. In this case, improper operation of the device that acts as a clock would seem to result since the given time interval between two consecutive pulses from comparator 19 is not constant. But this in no way perturbs the operation of the purging device since no purge is required during an underload period, as the buffer register tends to empty by itself. As mentioned earlier, $L_{(t)}$ has been limited to a minimum value (of 10, for example, as shown in Table I). Since the contents of buffer register 10 cannot reach this minimum number of packets during underload periods, comparator 18 will not activate the purging mechanism through device 22.

Figure 4:
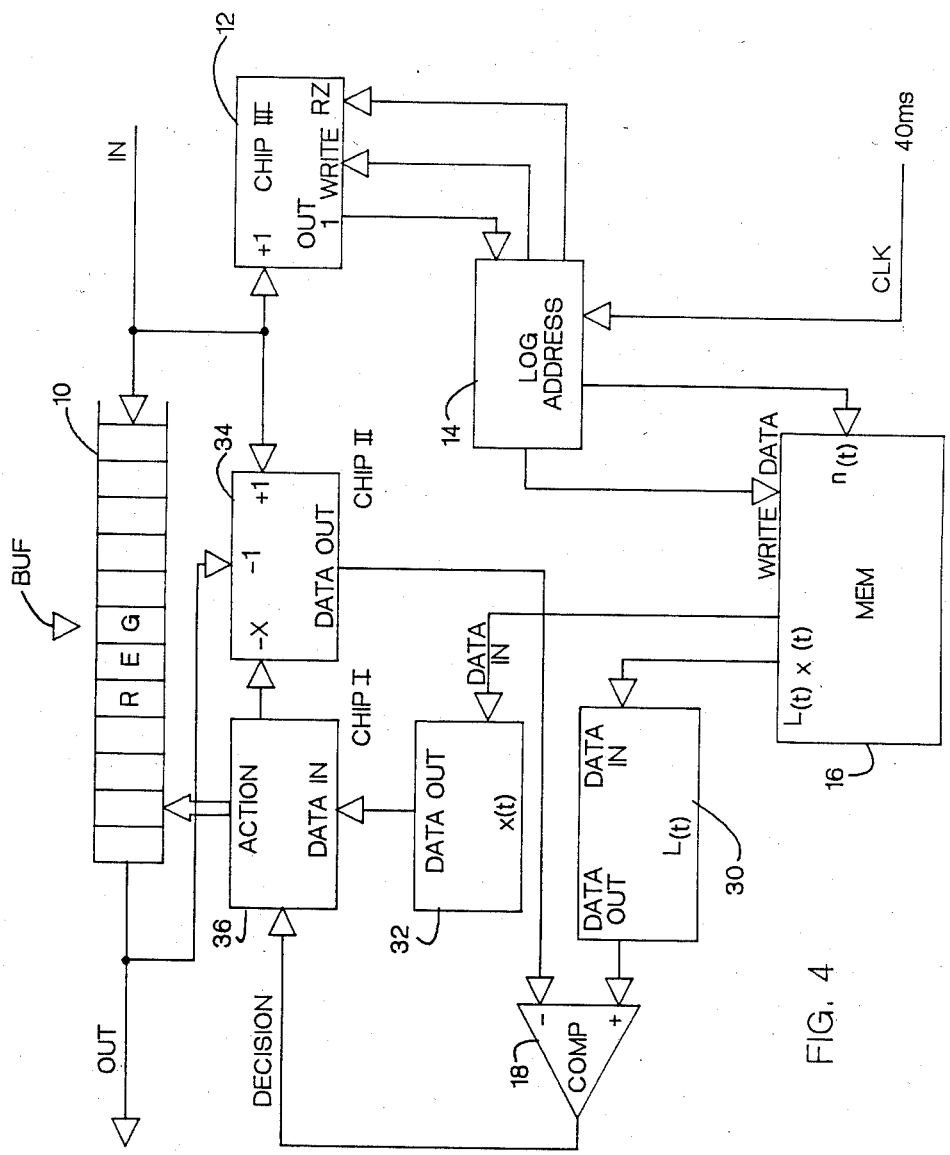
FIG. 4 is a variant of the FIG. 3 embodiment.

FIG. 4 illustrates a more detailed embodiment of the FIG. 2 device. Counter 12 is labeled "chip III". This counter has an input, +1, that is connected to the input of register 10 to which the packets of bits are applied. Whenever a packet is received, the contents of counter 12 are increased by one. Counter 12 also has a data output, "OUT1", and two more inputs, a "WRITE" data input and a reset to zero input "RZ", connected to circuit 14. Every 40 ms, a clock input, "CLK", of device 14 receives a clock pulse. This causes a "1" logic level to be sent over the lines connected to the "WRITE" and "RZ" inputs of counter 12. As a result, the contents of counter 12 are transferred to circuit 14 over the "OUT1" line, and, in addition, counter 12 is reset to zero and is consequently ready to begin the operations associated with the next 40 ms cycle. Upon completion of these operations, the logic level of a so-called "WRITE" output from circuit 14 goes to "1", thereby causing the address information $n_{(t)}$ supplied by circuit 14 on one of its outputs designated "address" to address and read memory 16. Memory 16 then provides on one of its outputs, the values of $L_{(t)}$ and $x_{(t)}$ stored at address $n_{(t)}$ of memory 16. The values of $L_{(t)}$ and $x_{(t)}$ are respectively loaded into registers 30 and 32.

Another counter, labeled "chip II" 34, is connected to the input and to the output of buffer register 10. Every time a packet is loaded into register 10, the contents of counter 34 increase by one. Every time a packet leaves register 10, the contents of counter 34 decrease by one. The contents of counter 34, available on one of its outputs labeled "DATA OUT", are applied to comparator 18. As soon as the output from counter 34 is equal to $L_{(t)}$, the output from comparator 18 goes to the "1" logic level. This causes the contents of register 32 to be transferred to a logic device 36 (chip I). Device 36 then causes the contents of register 10 to be shifted by $x_{(t)}$ packets, with no packet actually being transferred through the output OUT of register (REG) 10 to the modem (not shown). The value of $x_{(t)}$ is also sent from device 36 to the −x input of counter 34, whose contents consequently decrease by $x_{(t)}$ units.

Obviously, the circuit of FIG. 4 can also be used to realize the device of FIG. 3, provided counter 21 and comparator 19 are added thereto.

Figure 5:
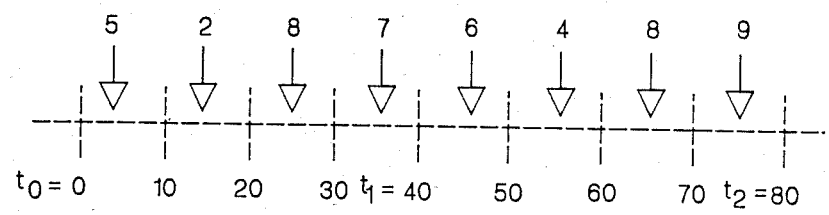
FIG. 5 illustrates a specific example of a mode of operation of the inventive device.
Figure 5:
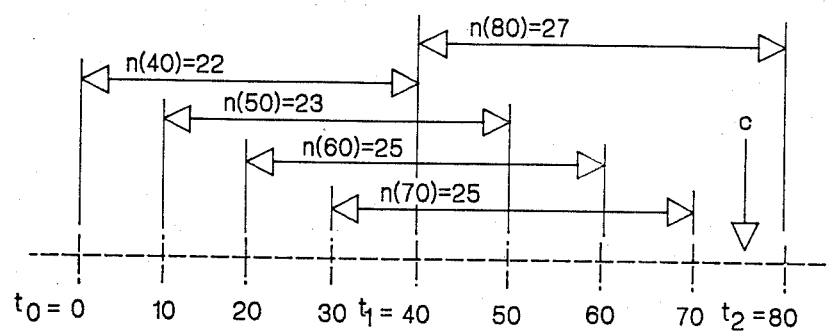
Figure 5:
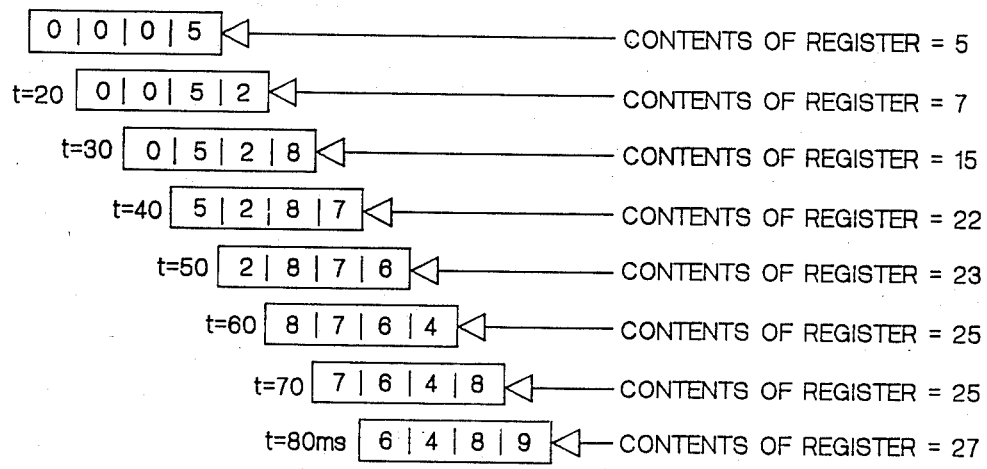

In both the FIG. 2 and the FIG. 3 embodiments of the invention, it is as if $L_{(t)}$ was measured and compared with the contents of counter 20. The condition "length of the queue in the buffer register is equal to $L_{(t)}$" activates the purging mechanism. Assume that $n_{(t)}$ is measured between times $t_0=(k-1)\times 40$ ms, and, $t_1=k\times 40$ ms, and that $n'_{(t)}$ is measured between $t_1$ and time $t_2=(K+1)\times 40$ ms. Further assume that the condition required for the purge mechanism to be activated occurs between $t_1$ and $t_2$. If so, the values $x_{(t)}$ and $L_{(t)}$ are defined by $n_{(t)}$ and not by $n'_{(t)}$. This is the reason why safety margins have been provided to compensate for excessively rapid variations of $n_{(t)}$. In fact, $n_{(t)}$ can also be measured at more frequent time intervals of, for example, 10 ms or 2.5 ms. In this case, logic circuit 14 should include a shift register into which the contents of counter 12 (see FIGS. 2 and 3) would be loaded every 10 ms or every 2.5 ms. At time $t_2$, the contents of stages of the shift register (not shown) should be added together. FIG. 5 is a schematic diagram illustrating by way of example the operation of the system described above, for the purposes of which values of $t_0=0$, $t_1=40$ ms and $t_2=80$ ms were chosen. Assume that during the 10 ms intervals defined between $t_0$ and $t_2$ the packets successively received at the input of buffer register (REG) 10 numbers are: 5, 2, 8, 7, 6, 4, 9 and 8. In this example, the shift register (see FIG. 5) to be provided in logic circuit 14 would have four stages. At time $t_0=0$, this shift register, which was initially empty, receives value 5 so that its contents are 0005. Ten milliseconds later, value 2 reaches the input of the shift register, whose contents are shifted to become 0052; and so forth. This being so, the $n_{(t)}$ value that will be used to address memory 16 at time $t_2$ will be $n_{(t)}=27$.

While the invention has been particularly shown and described with reference to a preferred embodiment thereof, it will be understood by those skilled in the art that numerous changes in form and detail may be made therein without departing from the spirit and scope of the invention.

What is claimed is:

1. A buffer device used in a digital transmission network wherein packets of bits from asynchronous terminal equipments are multiplexed by a concentrator in order to be sent over a transmission channel, said buffer device being characterized in that it includes:
    a buffer storage for sequentially storing packets of bits from the terminal equipments;
    input means connecting the input of the buffer storage to said asynchronous terminal equipments;
    first counting means connected to said input means for counting the number $n_{(t)}$ of packets of bits supplied by said terminal equipments during a given time interval;
    second counting means connected to the buffer storage for counting the number of packets contained in said buffer storage; and,
    purging means including:
        a logic device connected to said first counting means and providing for each value of said number $n_{(t)}$ digital values $L_{(t)}$ and $x_{(t)}$ respectively defining the optimal length of the buffer storage and the number of packets to be eliminated therefrom to perform the so-called purging operation;
        comparison means connected to said second counting means and supplying a logic indication denoting the equality of $L_{(t)}$ and the contents of said buffer storage; and
        a purging device responsive to said logic indication to eliminate from the buffer storage $x_{(t)}$ consecutive packets of bits contained therein.

2. A buffer device according to claim 1, characterized in that said given time interval is determined by a real-time clock.

3. A buffer device according to claim 1, characterized in that said given time interval is determined by a device that counts a predetermined number of packets at the output of said buffer storage.

4. A buffer device according to any one of claims 1 to 3, further characterized in that said asynchronous terminal equipments receive voice signals.

5. A buffer device according to any one of claims 1 to 3, further characterized in that said logic device providing for each value of $n_{(t)}$ corresponding values $L_{(t)}$ and $x_{(t)}$, consists of a memory previously loaded to store, at every address corresponding to a possible value of $n_{(t)}$, a value of $x_{(t)}$ and a value of $L_{(t)}$.

6. A buffer device according to claim 5, characterized in that each of said terminal equipments includes:
    a given number of terminal units performing a digital coding of voice signals, each of said terminal units being assigned to a speaker with whom an active telephone set is associated; and
    a scanning device for synchronously scanning said terminal units whose data are transmitted to the concentrator.

7. A buffer device according to claim 6, characterized in that the values of $L_{(t)}$ and $x_{(t)}$ stored at addresses $n_{(t)}$ are defined by the relations:

$$x_{(t)} \geq (\rho_{(t)} - 1) \cdot n_{(t)} \text{ and } x_{(t)} \leq n_{(t)}$$

where $$\rho_{(t)} = \frac{n_{(t)}}{C}$$

C being the equivalent capacity of the transmission channel, and $$L_{(t)} \geq x_{(t)}.$$

8. A buffer device according to claim 7, further characterized in that $x_{(t)}$ is limited to a lower value such that:

$$x_{(t)} = (n_{(t)} + \Delta n) \cdot \left( \frac{n_{(t)} + \Delta n}{C} - 1 \right)$$

wherein $\Delta n$ is a number.

9. A buffer device according to claim 8, further characterized in that $L_{(t)}$ is limited to a lower value equal to at least the number of terminal equipments attached to the transmitting end of the transmission network.

10. A buffer device according to claim 9, further characterized in that the digital coding of voice signals by said terminal units involves the use of so-called BCPCM techniques.

11. A buffer device according to claim 10, further characterized in that transmissions over the transmission channel are carried out through a modem.

* * * * *